United States Patent [19]

Cohn et al.

[11] Patent Number: 4,547,883
[45] Date of Patent: Oct. 15, 1985

[54] LONG PULSE LASER WITH SEQUENTIAL EXCITATION

[75] Inventors: David B. Cohn, San Pedro; Hiroshi Komine, Torrance, both of Calif.

[73] Assignee: Northrop Corporation, Hawthorne, Calif.

[21] Appl. No.: 533,387

[22] Filed: Sep. 16, 1983

[51] Int. Cl.$^4$ ............................................. H01S 3/10
[52] U.S. Cl. ........................................ 372/25; 372/82;
372/83; 372/87; 372/38; 372/86
[58] Field of Search ................... 372/82, 87, 81, 83,
372/25, 38, 86

[56] References Cited

PUBLICATIONS

Jeffers et al; "Relaxation Phenomena in the Water Vapor Laser"; *Appl. Phys. Lett.*, vol. 13, No. 8, Oct. 15, 1968, p. 250.

Bokhan; "On a Possibility of Using Noncontracted Discharge to Enhance the Power of a $CO_2$—$N_2$—He Laser", *Opt. Spectros.*, vol. 25, No. 3, Sep. '68.

*Primary Examiner*—William L. Sikes
*Assistant Examiner*—Léon Scott, Jr.
*Attorney, Agent, or Firm*—Terry J. Anderson

[57] ABSTRACT

A laser having its lasing medium located within two or more portions of a single optical cavity. The lasing media within different portions of a single optical cavity are excited in sequence to obtain lasing actin over an extended temporal period.

5 Claims, 1 Drawing Figure

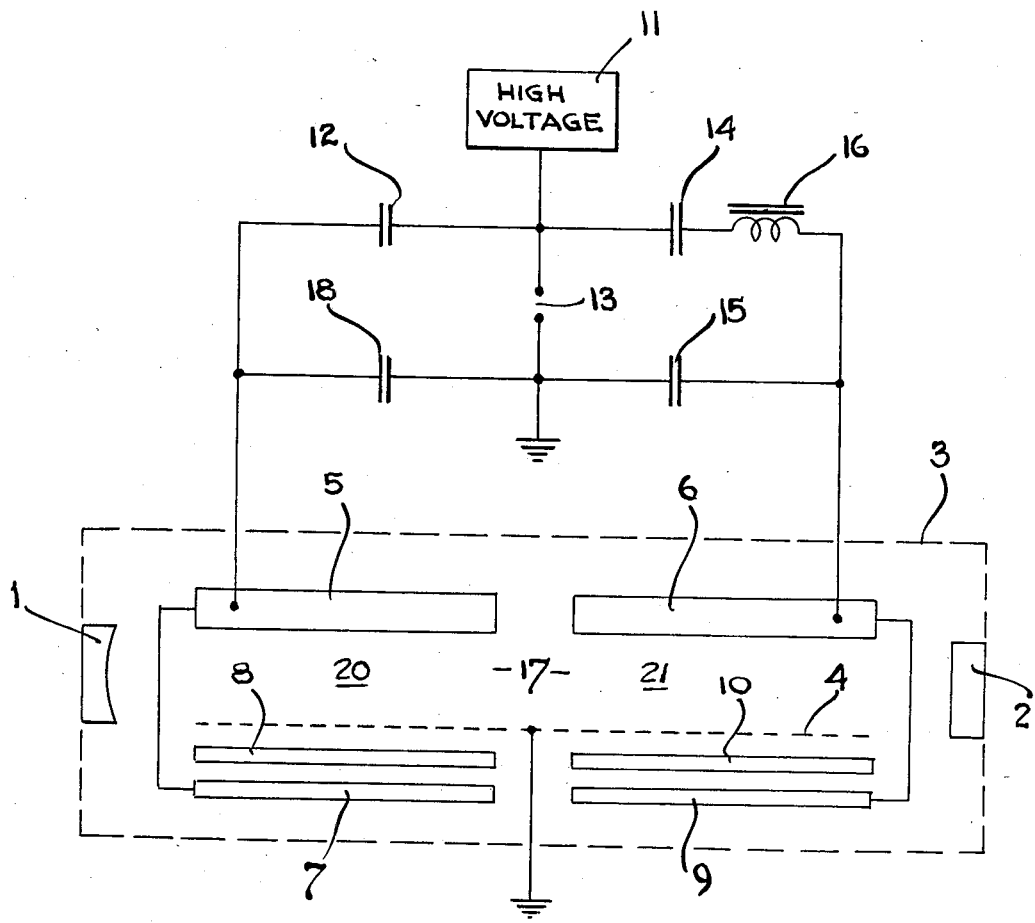

LONG PULSE LASER WITH SEQUENTIAL EXCITATION

BACKGROUND OF THE INVENTION

1. Field of the Invention

The invention pertains to means for exciting pulsed lasers. More particularly, the invention pertains to a method and means for extending the duration of the lasing action within a laser by sequentially exciting different portions of the laser gain medium.

2. Description of the Prior Art

A principal factor limiting the maximum output pulse length that can be obtained from a pulsed laser is the maximum time the laser gain medium can remain excited so that it has optical gain.

For example, for many types of laser gain media, the output pulse length is limited because quenching phenomena prevent the gain medium from remaining excited so as to have optical gain for more than a limited period of time, even if one attempts to pump the gain medium for a longer time period.

Also, a pulsed gas discharge laser has a limited output pulse length for an additional reason. In this type of laser, the gaseous gain medium is excited by an electric glow discharge in the gas. The duration of the excitation is limited because, after a certain period of time, the glow discharge will break down into arcs of high current density which do not effectively excite the gain medium.

SUMMARY OF THE INVENTION

The laser according to the present invention comprises a laser gain medium of which different portions are separately excited in sequence. The different portions of the gain medium need not be separated by physical boundaries.

The sequential excitation enables the laser resonator to be excited for a total period exceeding the maximum time any one portion of the gain medium can be excited, thereby permitting a longer laser pulse to be produced.

BRIEF DESCRIPTION OF THE DRAWING

The sole FIGURE is a schematic drawing of the preferred embodiment of the invention.

DETAILED DESCRIPTION OF THE PREFERRED EMBODIMENT

The present invention, which involves sequential excitation of different portions of a laser gain medium, can be used in conjunction with any conventional laser resonator.

The preferred embodiment, comprising a conventional gas discharge laser resonator, is shown in the FIGURE and will be discussed first.

In the preferred embodiment, a high reflectivity mirror 1, having a 2 m radius of curvature, and a flat, partially reflective mirror 2 form an optical resonating cavity 65 cm in length having a clear optical aperture of 1.9 cm in diameter. In the preferred embodiment, the laser gain medium is a gas 17, consisting of the gaseous mixture of HCl/Xe/Ne/He - 0.2/3/5/91.8% at 25 psia, which is contained within container 3. In this embodiment, mirrors 1 and 2 form a part of container 3. However, mirrors 1 and 2 could be located outside of the container if suitable antireflective windows were included as part of the container.

A first portion 20 of the gas 17 within the optical cavity is excited by the discharge of electrical current between a first pair of discharge electrodes consisting of mesh anode 4 and first cathode 5. Only that portion of the gas located between cathode 5 and the portion of mesh anode 4 adjacent to cathode 5 is excited by this discharge. This portion of the gas is referred to here as the first gas region 20.

About 20 nanoseconds after the discharge from first cathode 5 has been initiated, a second portion 21 of the gas in the optical cavity adjacent to a second cathode 6 is excited by the discharge of electrical current between a second pair of discharge electrodes consisting of second cathode 6 and the portion of mesh anode 4 adjacent thereto. The delay of 20 nanoseconds may be increased or decreased so as to obtain the desired shape of the optical output pulse.

Although mesh anode 4 is depicted as one element, as described above, different portions of it operate in cooperation with cathodes 5 and 6. Accordingly, the single mesh anode 4 is effectively two separate anodes that are connected electrically, and two physically separate anodes could be used instead of the one common anode used in the preferred embodiment.

Also, the polarity of the discharge electrodes is not essential to the present invention, and the cathodes and anodes could be reversed so that the discharge electrodes consist of two separate anodes and a common cathode.

The respective portions of the gaseous gain medium 17 excited by the discharges from cathodes 5 and 6 are referred to herein as the first and second gas portions or regions 20 and 21. Each of the two regions 20 and 21 has a discharge volume of 20 cm$^3$ and a gain length of 20 cm. In the preferred embodiment, the periods of the discharges in the first and second regions 20 and 21 do not overlap. However, if the cavity photon decay time is short, the periods of the discharges may be overlapped to obtain a continuous output pulse.

In the preferred embodiment, an inductive time delay circuit is used to delay initiating the second discharge until a predetermined time after the first discharge is initiated. Specifically, high voltage source 11 supplies approximately 20,000 volts to capacitor 12. When capacitor 12 is first charged, the voltage from cathode 5 to ground and across capacitor 18 is negligible because any voltage otherwise existing is discharged through the gas or, if necessary, through a resistance. When it is time to initiate the first discharge, a high voltage switch, preferably spark gap 13, is activated so as to short voltage source 11 to ground, thereby connecting capacitor 12 across capacitor 18. As a consequence, a portion of the charge in capacitor 12 is transferred to capacitor 18 at a rate determined by the inductance of the connections among the capacitors and the spark gap.

When the voltage between the first cathode 5 and mesh anode 4 reaches a high enough level to break down the gas in the first region 20, the discharge through the first gas region 20 begins. Capacitors 12 and 18 then supply current through the first discharge electrode pair 4 and 5 to sustain the discharge. Capacitor 18 is closely connected to cathode 5 and mesh anode 4 so as to provide a low inductance path for this rapid discharge. In the preferred embodiment, capacitors 12 and 18 each have a capacitance of approximately 6.5 nF. However, in general it is not necessary that the two capacitors be equal in size.

The gas in the second region 21 is excited in a similar fashion by a discharge between cathode 6 and mesh anode 4. In this case, the charge is stored on capacitor 14 and then transferred in part to capacitor 15, cathode 6 and mesh anode 4 when the aforementioned arc at spark gap 13 shorts high voltage source 11 to ground. However, with respect to the second gas region 21, the discharge is delayed because the charge must first pass through saturable inductor 16. Saturable inductor 16 is a one-turn inductor composed of a number of ferrite toroids. Five to twenty such toroids, each having a core area of 1.16 cm and a saturation magnetic field strength of 3,600 Gauss, were used in the preferred embodiment.

When the voltage across capacitor 14 is effectively placed across saturable inductor 16 by the short circuit at spark gap 13, the current through the inductor increases at a relatively slow rate determined by the unsaturated inductance of inductor 16. However, when the saturation point is reached, the effective inductance suddenly becomes small and the charge transfers rapidly from capacitor 14 to capacitor 15, cathode 6 and mesh anode 4 and then is discharged rapidly through the gas in the second region 21. The number of toroids controls the rate at which current increases through the inductors, and hence controls the time delay before saturation is reached and thus the time delay before the charge in capacitor 14 is transferred to capacitor 15. The toroids, accordingly, operate to delay the time at which the discharge occurs in the second gas region 21 relative to the time when the discharge occurs in the first gas region 20.

In actual tests of the preferred embodiment using five of the aforesaid toroids for saturable inductor 16, the output pulse length of the laser was increased from about 15 ns to 35 ns (full width between laser optical output half maximum points). Longer pulse lengths were obtained with ten or more ferrite toroids, but the output pulse displayed two distinctively separate peaks with a spacing between the peaks corresponding approximately to the time delay between the discharges through the first and second cavity units.

Generally, a single uninterrupted laser output pulse can be obtained, and the above-described occurrence of separate output peaks can be avoided, by initiating the second electric discharge before the end of the laser output pulse produced in response to the first discharge. The most obvious method of accomplishing this is to initiate the second discharge before the first discharge ends. However, since the laser output pulse generally continues for some time after the first electric discharge ends, in many cases the second discharge can even be initiated after the first discharge ends without interrupting the laser output. Delaying the second discharge as long as possible without causing an interruption in the laser output pulse is desirable to maximize the duration of the output pulse.

The preferred embodiment also includes means for pre-ionizing the gas 17 to improve the uniformity of the electric discharge in the gas. Specifically, a corona electrode 7, which is attached electrically to cathode 5, and separated from mesh anode 4 by a dielectric sheet 8, operates to produce ultraviolet photons which penetrate the first portion of gas 20 and produce ion and electron pairs therein. A similar corona electrode 9 is electrically connected to cathode 6 and located adjacent to mesh anode 4 and separated from the anode by dielectric sheet 10. Corona electrode 9 operates in a similar manner to pre-ionize the second portion of gas 21.

The essential element of the invention is the sequential excitation of different portions of a laser gain medium. Accordingly, the use of the invention is not restricted to excitation of the gain medium by electrical discharge, but could be used with other means of excitation such as photo-absorption.

Furthermore, the invention also is not limited to the use of a gas as a gain medium, but could be used with various conventional solid or liquid gain media. However, the gain medium should be such that the first portion 20 does not become so absorptive (negative optical gain) during the period the second portion 21 is excited that the entire gain medium 17 fails to have a positive overall gain. Therefore, the gain medium preferably should not be a three-level laser medium and should not be self-terminating. However, many four-level laser media should be suitable.

Although the preferred embodiment has only two portions of the gain medium which are excited sequentially, the invention may be extended to the sequential excitation of three or more portions of the gain medium. The other in which the different portions are excited need not be the same as their order of physical arrangement, and indeed, it may be preferable to excite them in staggered order. In the case of a gas discharge laser, the inductive time delay circuit shown in the FIGURE could be adapted to sequentially excite three or more discharge electrode pairs by exciting successive electrode pairs through progressively larger saturable inductors to obtain progressively longer time delays.

We claim:

1. A pulsed laser having an elongated cavity comprising:

a laser gain medium gas;

first excitation means for exciting a first portion of the gain medium gas during a first time interval so that the laser produces an optical output pulse in response to said excitation, said first excitation means including a pair of electrodes positioned adjacent said first portion of the gain medium of the elongated cavity, to excite the gain medium gas within said portion by means of an electric discharge through said portion of said gain medium gas;

second excitation means for exciting a second portion of the gain medium gas during a second time interval which begins subsequent to the beginning of said first time interval and which ends subsequent to the end of said first time interval, said second excitation means, including a pair of electrodes positioned adjacent said second portion of the gain medium of the elongated cavity, to excite the gain medium gas within said portion by means of an electric discharge through said portion of the gain medium gas;

a voltage source for supplying a voltage between a voltage source output terminal and a common terminal, the common terminal being connected to one of the electrodes of the first excitation means and to a corresponding one of the electrode(s) of the second excitation means;

a high voltage switch connected between the voltage source output terminal and the common terminal;

a first capacitor connected between the voltage source output terminal and the other electrode of the first excitation means;

a second capacitor connected between the common terminal and said other electrode of the first excitation means;

a saturable inductor and a third capacitor connected in series to form a series circuit, the series circuit being connected between the voltage source output terminal and the other electrode of the second excitation means; and a fourth capacitor connected between the common terminal and said other electrode of the second excitation means, whereby the optical output pulse in response to excitation by the second excitation means begins at a time interval prior to the end of the optical output pulse produced in response to the excitation by the first excitation means.

2. A laser according to claim 1, wherein:

the first and second excitation means respectively comprise a cathode, a mesh anode, a corona electrode and a dielectric sheet, the corona electrode being separated from the mesh anode by the dielectric sheet, the mesh anode being located spatially between the cathode and the corona electrode, the corona electrode being electrically connected to the cathode and the cathode being located with respect to the mesh anode so as to discharge current between the cathode and the mesh anode through respective portions of the gain medium gas.

3. The pulsed laser according to claim 1 further including:

a corona electrode associated with each of said portions of gain medium gas and electrically connected to the respective electrodes of said first and said second excitation means and separated from the other respective electrodes of said first and said second excitation means by a dielectric material so as to maintain an excitation current through respective portions of the gain medium gas for preionizing said gain medium gas.

4. A pulsed gas discharge laser having an optical cavity comprising:

a gas laser gain medium occupying first and second excitation regions of the optical cavity;

first excitation means for producing an electric discharge in the gas medium occupying the first region, and having first and second electrodes disposed on opposite sides of the first region;

second excitation means for producing an electric discharge in the gas medium occupying the second region, and having first and second electrodes disposed on opposite sides of the second region;

a voltage source for supplying a voltage between a voltage source output terminal and a common terminal, the common terminal being connected to the second electrode of the first excitation means and the second electrode of the second excitation means;

a high voltage switch connected between the voltage source output terminal and the common terminal;

a first capacitor connected between the voltage source output terminal and the first electrode of the first excitation means;

a second capacitor connected between the common terminal and the first electrode of the first excitation means;

a saturable inductor and a third capacitor connected in series to form a series circuit, the series circuit being connected between the voltage source output terminal and the first electrode of the second excitation means; and a fourth capacitor connected between the common terminal and the first electrode of the second excitation means, whereby the optical output pulse in response to excitation by the second excitation means begins at a time interval prior to the end of the optical output pulse produced in response to the excitation by the first excitation means.

5. The pulsed laser according to claim 4 further including:

a corona electrode associated with each of said portions of gain medium gas and electrically connected to the respective electrodes of said first and said second excitation means and separated from the other respective electrodes of said first and said second excitation means by a dielectric material so as to maintain an excitation current through respective portions of the gain medium gas for preionizing said gain medium gas.

* * * * *

UNITED STATES PATENT OFFICE
CERTIFICATE OF CORRECTION

PATENT NO. : 4,547,883
DATED : Oct. 15, 1985
INVENTOR(S) : David B. Cohn and Hiroshi Komine It is certified that error appears in the above-identified patent and that said Letters Patent are hereby corrected as shown below:

Title page:

In the Abstract, line 4, delete "actin" and substitute therefor --action--.

Signed and Sealed this

Fourteenth Day of January 1986

[SEAL]

Attest:

Attesting Officer

DONALD J. QUIGG

Commissioner of Patents and Trademarks